United States Patent [19]

Plapp et al.

[11] 4,373,383
[45] Feb. 15, 1983

[54] DEVICE FOR BURNOFF OF A MEASURING RESISTOR

[75] Inventors: Günther Plapp, Filderstadt; Peter Romann, Stuttgart, both of Fed. Rep. of Germany

[73] Assignee: Robert Bosch GmbH, Stuttgart, Fed. Rep. of Germany

[21] Appl. No.: 151,843

[22] Filed: May 21, 1980

[30] Foreign Application Priority Data

Jul. 6, 1979 [DE] Fed. Rep. of Germany ....... 2927378

[51] Int. Cl.³ .................................................. G01F 1/68
[52] U.S. Cl. .......................................... 73/118; 73/204
[58] Field of Search ................... 73/204, 118; 123/478

[56] References Cited

U.S. PATENT DOCUMENTS 4,196,622 4/1980 Peter ....................................... 73/204

Primary Examiner—Jerry W. Myracle
Attorney, Agent, or Firm—Edwin E. Greigg

[57] ABSTRACT

A device is proposed for burnoff of a measuring resistor, in particular a hot wire or hot film in the air flow rate meter of an internal combustion engine, wherein the occurrence of the burnoff procedures, their intensity, and their duration can be controlled in open-loop fashion. Primarily the initiation of a burnoff procedure is made dependent upon how often the driving or ignition circuit of a vehicle equipped with the engine is shut off. The initiation of the procedure can be controlled in addition in accordance with operational characteristics, for instance. The realization substantially includes a counter following the driving switch and having an associated comparator, wherein the threshold value of this comparator is controllable both in accordance with operational characteristics and, if needed, in accordance with time. Furthermore a timing element is provided with the aid of which the onset of a burnoff procedure can be delayed after the shutoff of the engine. The different intensity of a burnoff procedure can be realized via the parallel disposition of different resistors with the bridge resistors, in order to obtain a predefined bridge imbalance.

13 Claims, 1 Drawing Figure

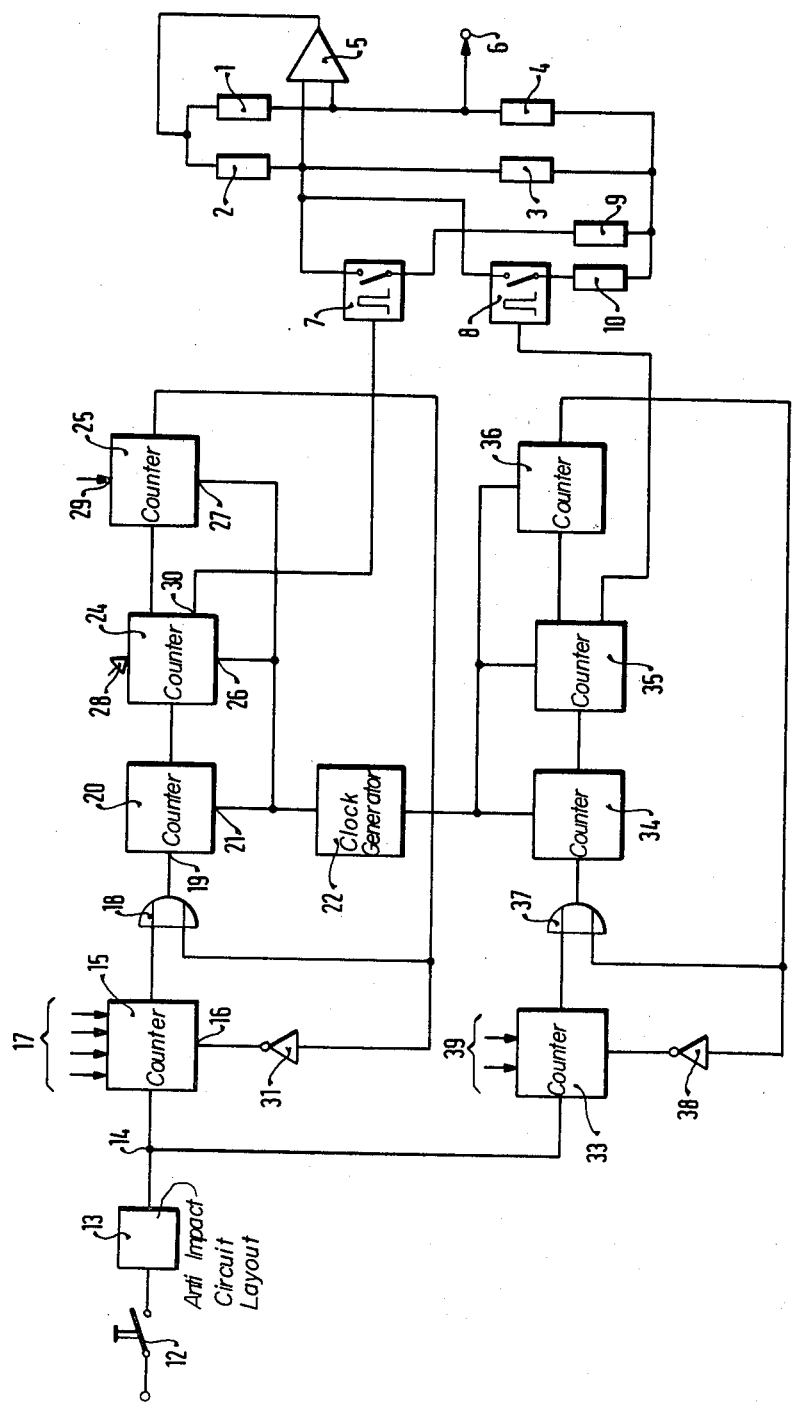

DEVICE FOR BURNOFF OF A MEASURING RESISTOR

BACKGROUND OF THE INVENTION

A hot wire air flow rate meter in a motor vehicle is known in which the hot wire is burned off to remove dirt particles after each shutoff of the engine. This is accomplished by means of a predefined imbalance of a bridge circuit, in which the hot wire represents one of the bridge resistors. In principle, this continuously recurring burnoff produces good results; however, the service life of the hot wire is shortened thereby. In addition, experience has shown that a frequent burnoff at a relatively low temperature (ca. 850° C.) burns off only organic soil particles, but cannot prevent the deposit of silicate glasses. These silicate glasses are formed from road dust and they impair the measurement result. It has been found that these silicate glasses can be melted off from the hot wire at high temperatures (ca. 1200° C.), but this procedure involves changes in the surface of the wire and in the characteristic curve brought about as a result of thermal etching of the surfaces of the hot wire.

OBJECTS AND SUMMARY OF THE INVENTION

It is accordingly an object of the invention to disclose possible remedies to the problems discussed above, first showing how the surface of the measuring resistor can be burned off as completely as possible and additionally showing how high mileage can be attained in the vehicle while the measurement results remain as independent as possible from the effects of aging.

The device according to the invention for burnoff of a measuring resistor enables the attainment of long service life in the hot wire with a simultaneously good burnoff result, so that equally good measurement results remain attainable.

It has furthermore proved advantageous for a predetermined time interval to be provided between the shutoff of the engine and the initiation of the burnoff procedure. This serves to assure that air movement in the region of the hot wire will have died down after engine shutoff, so that the hot wire is not exposed to any mechanical stresses during the glow or burnoff phase. It is important that the hot wire attain the necessary glow temperature only when the air current is zero. At the same time, the necessary heat output is reduced, because since there is no air movement little energy is withdrawn from the wire.

It is furthermore efficient for the duration of the burnoff procedures to be controlled in open-loop fashion; that is, it is efficient to select the duration in accordance with operational characteristics of the engine.

Good results can also be attained if the heat output for burnoff of the hot wire is delivered to the hot wire in pulsed form.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows a device for burnoff of a hot wire in an air flow rate meter of a motor vehicle according to a best mode and preferred embodiment of the invention.

DETAILED DESCRIPTION OF THE PREFERRED EMBODIMENTS

Referring now to the drawings, there is shown a hot wire 1 disposed in an air intake manifold, not shown in further detail, of an internal combustion engine. It is part of a bridge circuit having three further resistors 2, 3 and 4, wherein the junctions of resistors 1 and 4 and well as of resistors 2 and 3 are carried to an amplifier 5 whose output signal in turn controls the bridge current. The air flow rate meter measurement signal can be picked up as a voltage drop over the resistor 4 and is available for use at an output terminal 6.

Parallel to the resistor 3 there are two series circuits each having one switch 7, 8 and a resistor 9, 10, with the aid of which a bridge imbalance can be brought about in order to initiate a burnoff procedure.

An ignition switch 12 is connected via an anti-impact circuit layout 13 with a branch point 14. The counting input of a first counter 15 is connected at this point with a reset input 16 as well as with various control inputs 17. On the output side, the counter 15 is connected via an OR gate 18 with the control input 19 of a second counter 20, at the counter input 21 of which pulses of constant frequency from a clock generator 22 are present. The counter 20 is followed by a series circuit made up of two further counters 24 and 25, which are both likewise connected via one input 26 and 27 each with the clock generator 22 and have additional control inputs 28 and 29. In addition, an output 30 of the counter 24 is carried to the control input of the switch 7. On the output side, the counter 25 is connected both directly to a second input of the OR gate 18 and via an inverter 31 to the reset input of the counter 15. Trigger circuits are capable of being replaced by counters or counter circuits.

The layout described above, having the four counters 15, 20, 24 and 25 is shown twofold in the block circuit diagram of the drawing, in order to be able, on the basis of a signal of the ignition switch 12, also to control the switch 8 in series with the resistor 10 in a manner corresponding to the control of switch 7. In detail, four further trigger circuits or counters 33, 34, 35 and 36 represent the second counter chain, with an OR gate 37 disposed between the counters 33 and 34, the counter inputs of the counters 34, 35, and 36 are connected to the clock generator 22, one output of the counter 35 is carried to the control input of the switch 8, and the output of the counter 36 is connected both with the OR gate 37 and, via an inverter 38, with the reset input of the counter 33.

In order that the burnoff procedures will occur at various temperatures, different values are selected for the two resistors 9 and 10.

The counters 15 and 35, because of their function, are designated as suppression counters; this is intended to mean that they count a number of potential changes deriving from the ignition switch and initiate a burnoff procedure only at a predetermined value. The criteria for the appearance of an output signal at these counters 15 and 33 can be established by way of their control inputs 17 and 39. Symbolically entered are the temperature $\theta$, the time t (in order to be able to control the burnoff procedures independently of the ignition switch), the sum of revolutions of an engine shaft $\Sigma n$, and the number of starts or shutoffs of the engine $\Sigma$ starts. In this manner it is attainable for the burnoff of the hot wire to occur, for instance, only after each third engine shutoff.

The counters 20 and 34 which follow the suppression counters 15 and 33 enable the establishment of a predetermined interval between the shutoff of the engine and the initiation of the burnoff procedure. This interval assures that there will be no further significant air throughput in the air intake manifold and thus the hot wire 1 in the air intake manifold of the engine will no longer be located in the air flow but rather will be surrounded by calm air. As a result, first the hot wire can be protected from mechanical stresses and second the heating energy can be selected to be less, because no further conduction of heat from the resistor will be taking place.

The duration of the burnoff can be established with the counters 24 and 35 also connected to the clock generator. The twofold embodiment of these counters is useful because in the illustrated exemplary embodiment the burnoff procedures can occur at different temperatures and, for reasons relating to service life of the hot wire, the burnoff times of the hot wire 1 should be kept substantially shorter at high temperatures than is the case with burnoff procedures at lower temperatures. Finally, the counters 25 and 36 serve to realize pulsed operation of the opening and closing of the switches 7 and 8, as a result of which burnoff procedures of longer duration, for instance, can be realized in an efficient manner. As a result of the expansion (stretching) and contraction of the wire, a mechanical cleaning of the wire is also attained in that deposits are shuffled off as the wire expands and contracts.

In order to be able to control the burnoff procedures of the hot wire separately at different temperatures, naturally the conditions for triggering the counters 25 and 33 must be selected differently. By way of example, the counter 15 may emit an output signal after every third shutoff of the ignition switch and the counter 33 may do so after every tenth ignition switch shutoff; thus, with these selected values, a burnoff procedure will occur at low temperature after every third shutoff and at high temperature after every tenth shutoff. Under some circumstances it must be made certain that the two switches 7 and 8 are not triggered simultaneously, which then, because the two resistors 9 and 10 would then be parallel, would cause still greater imbalance of the bridge circuit and accordingly would produce a still higher electrical current for the burnoff of the hot wire 1. This blocking circuit could be realized, for instance, by means of an exclusive OR gate disposed before each of the control inputs of the switches 7 and 8.

In summary, what is essential in the subject shown in the drawing is the following:

The burnoff procedures of the hot wire, or in general of the measuring resistor, occur at different temperatures.

Between the shutoff of the engine and the beginning of the burnoff procedure, there is an interval of predefined duration.

In contrast to known circuit layouts for burnoff purposes, burnoff procedures are suppressed.

The duration of the burnoff procedures is controllable in open-loop fashion.

The burnoff can occur in pulsed operation.

With the device for burnoff shown in the drawing and described above, these criteria can be attained both individually and in common, depending on the triggering of the individual counters.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States:

1. A device for burnoff of a measuring resistor, in particular a hot wire or hot film in the air flow rate meter of an internal combustion engine comprising:
   an open-loop control device coupled with a trigger circuit which emits a repeating output signal in response to the appearance of predetermined operational characteristics, said open-loop control device increasing the flow of electrical current through said resistor during the burnoff procedure.

2. A device as defined by claim 1, wherein for said burnoff procedures, different levels of electrical current can be controlled in open-loop fashion.

3. A device as defined by claim 2, wherein said different levels constitute different intensities, and such intensities are controllable separately by said open-loop fashion control device.

4. A device as defined by claim 1, wherein said burnoff procedures can be initiated after a predetermined number of starts and shutoffs of the engine.

5. A device as defined by claim 4, wherein said trigger circuit includes a timing element in order to initiate said burnoff procedure only after a predetermined period of time has elapsed after the shutoff of the engine.

6. A device as defined by claim 1, wherein said trigger circuit is triggered in pulsed fashion during one coherent burnoff procedure.

7. A device as defined by claim 1, wherein the duration of the burnoff procedure is controllable in open-loop fashion in particular in accordance with engine parameters.

8. A device as defined by claim 1, wherein the measuring resistor is disposed in a bridge circuit, and the burnoff procedure occurs by means of a predetermined bridge imbalance.

9. A device as defined by claim 8, wherein a different bridge imbalance is provided for differing burnoff intensities.

10. A device as defined by claim 9, wherein at least two resistors having different values can be switched parallel to one of the bridge resistors.

11. A device as defined by claim 9, wherein different supplemental resistors can be switched parallel to the different bridge resistors.

12. A device as defined by claim 1, further comprising a drive switch in circuit with at least one counter into which threshold values dependent on operational characteristics can be fed, and upon attainment of such a threshold value a burnoff procedure can be initiated.

13. A device as defined by claim 12, wherein the open-loop control of the threshold value of the counter is controllable in accordance with time, length of service and number of engine revolutions.

* * * * *